United States Patent
Sankaran

(10) Patent No.: US 9,716,978 B2
(45) Date of Patent: Jul. 25, 2017

(54) MOBILE COMMUNICATION DEVICE SYSTEM AND METHOD FOR DETERMINING MODE SETTINGS OF VEHICLE PASSENGERS

(71) Applicant: Motorola Mobility LLC, Chicago, IL (US)

(72) Inventor: Esakkiappan Sankaran, Sunnyvale, CA (US)

(73) Assignee: Motorola Mobility LLC, Chicago, IL (US)

( * ) Notice: Subject to any disclaimer, the term of this patent is extended or adjusted under 35 U.S.C. 154(b) by 148 days.

(21) Appl. No.: 14/749,829

(22) Filed: Jun. 25, 2015

(65) Prior Publication Data
US 2016/0381505 A1   Dec. 29, 2016

(51) Int. Cl.
| H04M 3/00 | (2006.01) |
| H04W 4/02 | (2009.01) |
| H04W 4/00 | (2009.01) |
| H04W 4/20 | (2009.01) |
| H04M 1/725 | (2006.01) |
| H04W 8/00 | (2009.01) |

(52) U.S. Cl.
CPC ....... *H04W 4/023* (2013.01); *H04M 1/72577* (2013.01); *H04W 4/008* (2013.01); *H04W 4/206* (2013.01); *H04M 1/7253* (2013.01); *H04M 2250/02* (2013.01); *H04W 8/005* (2013.01)

(58) Field of Classification Search
CPC ..... H04W 4/023; H04W 4/008; H04W 4/206; H04W 8/005; H04M 1/72577; H04M 1/72553; H04M 2250/02
See application file for complete search history.

(56) References Cited

U.S. PATENT DOCUMENTS

| 7,898,428 | B2 | 3/2011 | Dietz et al. | |
| 8,874,162 | B2 | 10/2014 | Schrader et al. | |
| 2011/0105082 | A1* | 5/2011 | Haley | H04M 1/72577 455/411 |
| 2016/0180604 | A1* | 6/2016 | Wilson | G07B 15/063 705/4 |
| 2016/0248905 | A1* | 8/2016 | Miller | H04W 4/008 |

OTHER PUBLICATIONS

Jie Yang, Simon Sidhom, Gayathri Chandrasekaran, Tam Vu, Hongbo Liu, Nicolae Cecan, Yingying, Chen, Marco Gruteser, Richard P. Martin, "Detecting Driver Phone Use Leveraging Car Speakers," MobiCom'11 (Las Vegas, Nevada Sep. 19-23, 2011).

* cited by examiner

*Primary Examiner* — Barry Taylor
(74) *Attorney, Agent, or Firm* — Cygan Law Offices P.C.; Joseph T. Cygan

(57) ABSTRACT

A method includes detecting, by a first mobile communication device, a group of mobile communication devices that are in proximity to the first mobile communication device; initiating pairing of each mobile communication device of the group with the first mobile communication device and with each other; providing, by the first mobile communication device, an alphanumeric code to the group of mobile communication devices along with a drive mode disable command; determining that the first mobile communication device is associated with the vehicle driver; and placing the first mobile communication device in drive mode and broadcasting an advertising packet to the other mobile communication devices of the group. The advertising packet contains a disable drive mode command and the alphanumeric code.

12 Claims, 5 Drawing Sheets

MOBILE COMMUNICATION DEVICE SYSTEM AND METHOD FOR DETERMINING MODE SETTINGS OF VEHICLE PASSENGERS

FIELD OF THE DISCLOSURE

The present disclosure relates generally to mobile communications devices such as mobile telephones that incorporate hands free operation using text-to-voice capability and speaker phone capability.

BACKGROUND

Mobile communication devices are increasingly being integrated with additional sensors. These sensors provide a variety of functionality such that mobile communication devices are becoming more powerful in determining a user's context and providing meaningful actions based on the determined context.

One such context determination is in-vehicle usage. A mobile communication device can determine whether a user is in a moving vehicle or not by using sensor data from one or more of an accelerometer and audio sensor and location data. After the mobile communication device makes a determination that the user is in a vehicle, it can adjust settings for hands-free mode and to facilitate the user focusing on the road while driving.

For example, some existing mobile communication devices can announce a caller's name and read out a text message for the user if the determined context is that the user is in a vehicle. This context detection response is desirable if the user is driving a car, because it facilitates the driver keeping her eyes on the road rather than being tempted to look at the mobile communication device. In some instances, the keypad or graphical user interface (GUI) may be locked to prevent the user from texting while driving. However, if the user is a passenger in the vehicle and is not the driver, the same response would be undesirable. Unfortunately, current in-vehicle context detection methods in mobile communication devices fail to distinguish between when the user is driving a car and is only a passenger in the car. This is because the data used for this purpose appears similar with respect to detected motion and location.

DETAILED DESCRIPTION

The present disclosure provides a system in which vehicle passenger mobile communication devices are distinguished from a vehicle driver's mobile communication device for the purpose of accordingly adjusting or maintaining mobile communication device settings. The vehicle driver's mobile communication device is accordingly placed in a driver mode of operation while the passenger mobile communication devices are allowed to operate outside of driver mode, despite the passenger mobile communication devices' detecting the driver mode triggering conditions.

Figure 1:
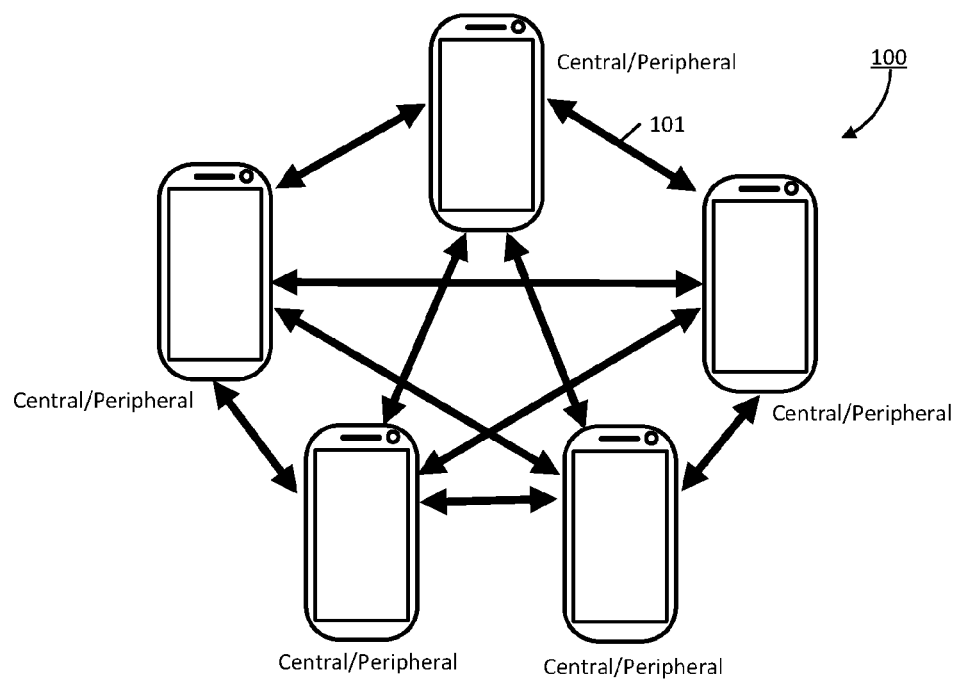
FIG. 1 is a diagram of a group of mobile communication devices pairing with each other using a low energy wireless protocol.

Turning now to the drawings, FIG. 1 is a diagram of a group 100 of mobile communication devices pairing with each other using a low energy wireless protocol 101. The low energy wireless protocol 101 may be Bluetooth® Low Energy (hereinafter "BLE" also referred to as "Bluetooth® Smart"). One of the mobile communication devices of the group 100 may send an invite message to the other members of the group 100 to initiate the pairing. In one embodiment, the first mobile communication device that sent the pairing invite generates an alphanumeric code. In an alternative embodiment, each mobile communication device of the group 100 independently generates an alphanumeric code in response to the pairing invite.

Each mobile communication device acts in both the roles of BLE central and BLE peripheral. In the BLE peripheral role, each mobile communication device may generate a unique alphanumeric code and send this code along with a pairing command to the other mobile communication devices. Each mobile communication device then pairs with each other mobile communication device, receives the unique alphanumeric codes and stores the alphanumeric codes in memory. In embodiments where only one of the mobile communication devices (the initiating mobile communication device) generates the alphanumeric code, each other mobile communication device receives the alphanumeric code from the initiating mobile communication device during pairing.

Figure 2:
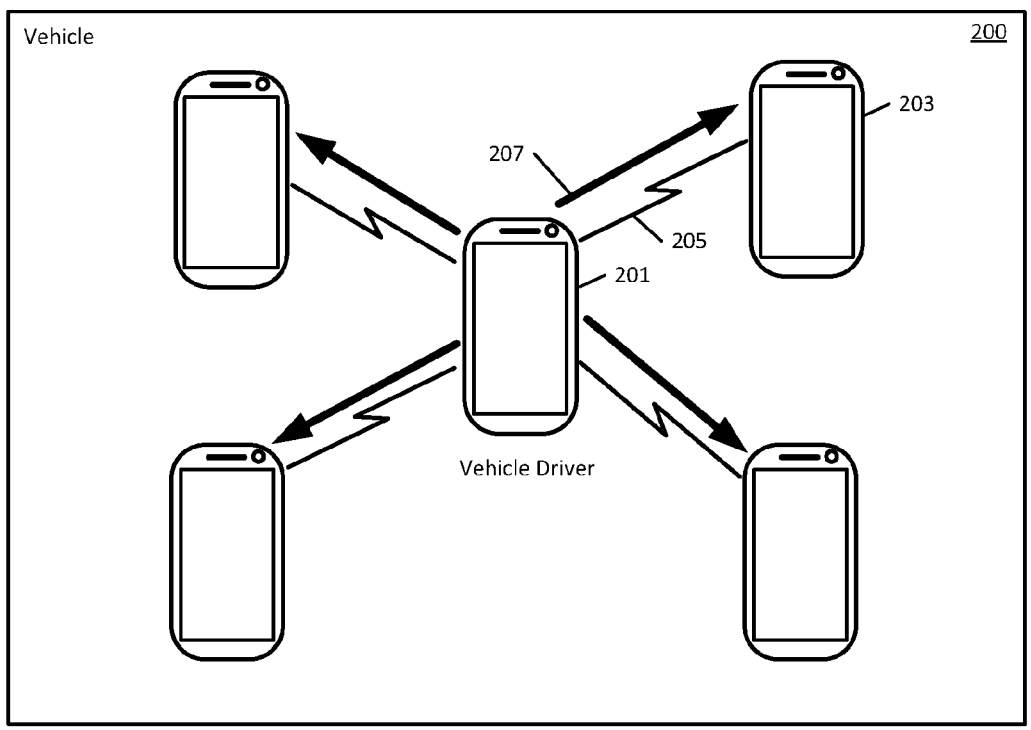
FIG. 2 is diagram of a vehicle driver's mobile communication device sending a broadcast message to other mobile communication devices in the group.

Following the pairing event shown in FIG. 1, at any time that one of the mobile communication devices of the group 100 determines that its user is the driver of a non-stationary motor vehicle, it switches to driver mode and broadcasts a short message (via BLE). This operation is illustrated in FIG. 2 which is a diagram of a vehicle 200 driver's mobile communication device 201 sending a broadcast message to passenger mobile communication devices 203 in the group. The group of mobile devices are located in the vehicle 200 and a first mobile communication device 201 is determined to belong to the vehicle driver. Put another way, the first mobile communication device 201 is determined to be associated with the vehicle driver. This determination may be made by any appropriate mechanism and is outside the scope of the present disclosure.

In response to a determination that mobile communication device 201 belongs to the vehicle driver, the mobile communication device 201 performs a BLE broadcast operation and uses a BLE advertising packet 207 over the BLE wireless interface 205. The advertising packet 207 includes the alphanumeric code described above, along with information indicating that its user is the driver of the vehicle 200. Upon receiving the advertising packet 207, driver mode in passenger mobile communication devices 203 is disabled, provided that the mobile communication device determine that an alphanumeric code included in the advertising packet 207 matches the previously received alphanumeric code stored in each mobile communication device's memory.

Figure 3:
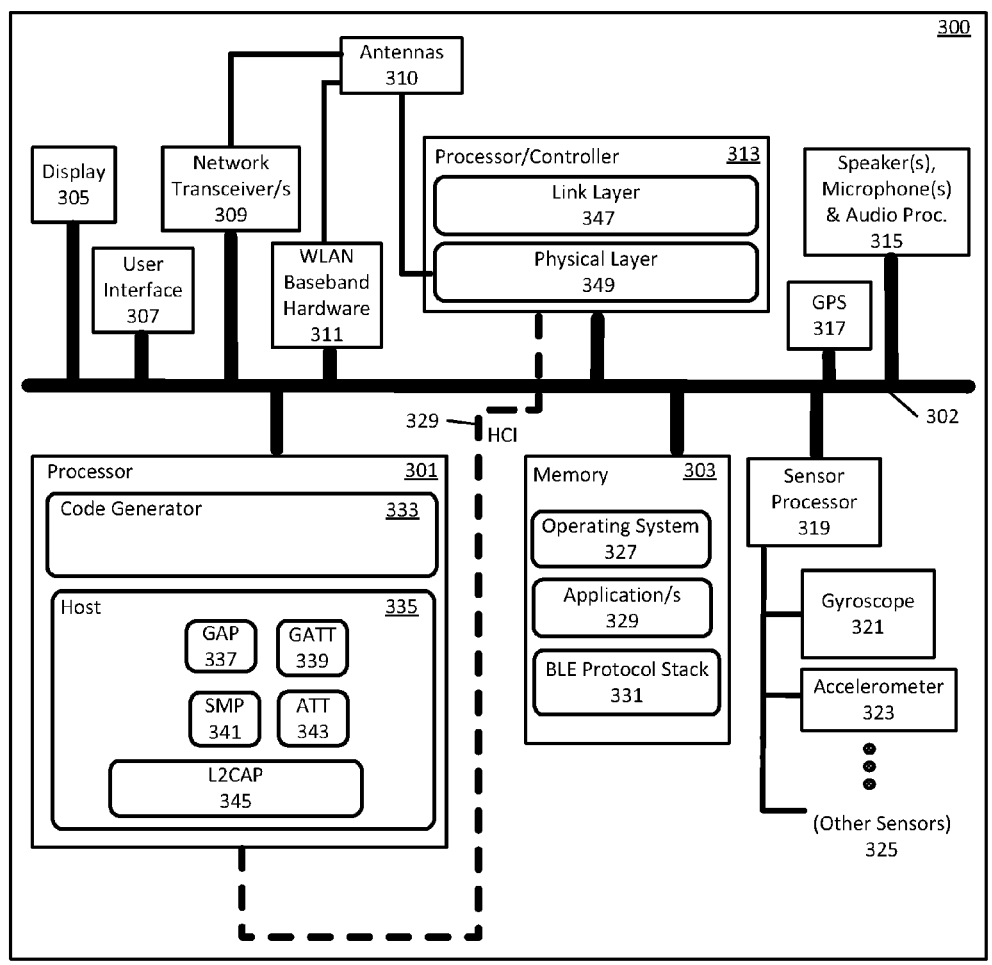
FIG. 3 is diagram of a mobile communication device in accordance with an embodiment.

FIG. 3 is a diagram of a mobile communication device 300 in accordance with an embodiment. In accordance with the example embodiment of FIG. 3, the mobile communication device 300 includes a code generator 333 that is operative to generate a unique alphanumeric code and broadcast it in an advertising packet over a wireless link. The mobile communication device 300 includes at least one processor 301, display 305, user interface 307, one or more wide area network (WAN) transceivers 309 (such as, but not limited to CDMA, UMTS, GSM, etc.), WLAN baseband hardware 311, processor/controller 313, GPS hardware 317, and non-volatile, non-transitory memory 303. Speakers, microphones and audio processing 315 may include, among other things, at least one microphone, at least one speaker, signal amplification, analog-to-digital conversion/digital audio sampling, echo cancellation, etc., which may be applied to one or more microphones and/or one or more speakers of the mobile communication device 300.

All of the mobile communication device 300 components shown are operatively coupled to the processor 301 by one or more internal communication buses 302. In some embodiments, a separate sensor processor 319 monitors sensor data from various sensors including a gyroscope 321 and an accelerometer 323 as well as other sensors 325. The gyroscope 321 and accelerometer 323 may be separate or may be combined into a single integrated unit.

The memory 303 is non-volatile and non-transitory and stores executable code for an operating system 327 that, when executed by the processor 301, provides an application layer (or user space), libraries (also referred to herein as "application programming interfaces" or "APIs") and a kernel. The memory 303 also stores executable code for various applications 329, and a BLE protocol stack 331. The processor 301 is operative to, among other things, launch and execute the operating system 327, applications 329 and the BLE protocol stack 331.

In the example embodiment illustrated in FIG. 3, the BLE protocol stack executed on the processor 301 includes the BLE host layer 335 and the code generator 333 which is executed in the application layer. The host layer 335 includes the Generic Access Profile (GAP) 337, Generic Attribute Profile (GATT) 339, Security Manager (SMP) 341, Attribute Protocol (ATT) 343 and Logical Link Control and Adaptation Protocol (L2CAP) 345. The processor 301 also executes the host side Host Controller Interface (HCI) 350 which enables communication with the processor/controller 313. The processor/controller 313 provides the BLE control layer including the Link Layer (LL) 347, Physical Layer (PHY) 349 and the controller side HCl of HCl 350. The Physical Layer 349 is operatively coupled to one or more antennas 310 for transmitting and receiving information using the BLE low energy wireless protocol. The one or more antennas 310 are also operatively coupled to one or more wide area network (WAN) transceivers 309.

It is to be understood that the host layer 335 and control layer (i.e. link layer 347 and physical layer 349) can be implemented in other ways that are contemplated by the present disclosure and that the example shown in FIG. 3 is only one possible implementation. For example, in some embodiments, the host layer and control layer may be implemented on a single integrated processor. In other example embodiments, the host layer and control layer may be executed on one processor, while the application layer is executed on another processor and communicates with the host layer using a proprietary protocol rather than HCl. Such various implementations are contemplated by the present disclosure. Furthermore, the memory 303 may be operatively coupled to the processor 301 and processor/controller 313 via the internal communications buses 302 as shown, may be integrated with, or distributed between the processors, or may be some combination of operatively coupled memory and integrated memory.

It is to be understood that any of the above described example components in the example mobile communication device 300, without limitation, may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof In embodiments in which one or more of these components is implemented as software, or partially in software/firmware, the executable instructions may be stored in the operatively coupled, non-volatile, non-transitory memory 303, and may be accessed by the processor 301, or other processors, as needed.

Figures 4, 5:
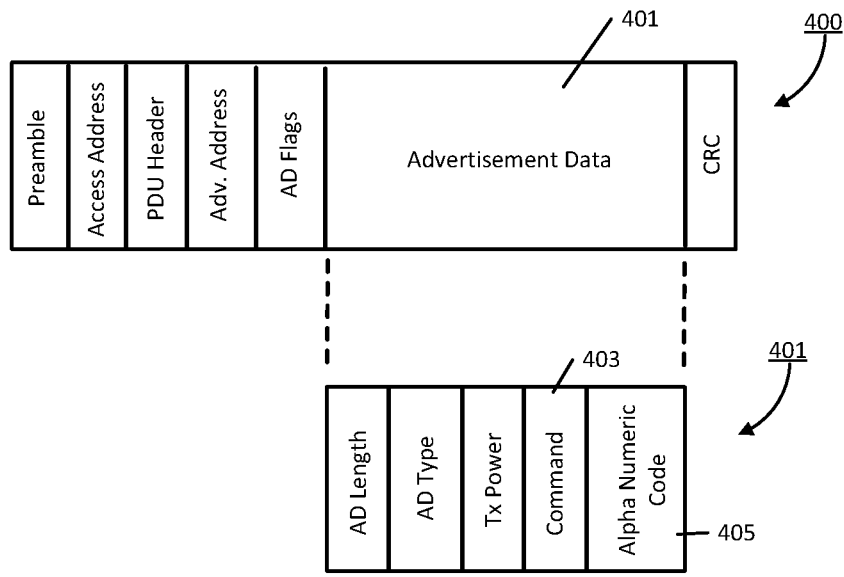
FIG. 4 is logical diagram representation of an advertisement packet in accordance with an embodiment.
FIG. 5 is a table providing further details of the advertisement packet shown in FIG. 4.

Turning to FIG. 4, a diagram representation of a modified advertisement packet 400 in accordance with an embodiment is illustrated. The advertisement packet 400 includes a preamble, access address, protocol data unit (PDU) header, advertisement address, flags field, advertisement data 401 field and a cyclic redundancy check (CRC) field. The advertisement data 401 includes a command 403 field and an alphanumeric code 405 field which is used as a drive mode deactivate code in accordance with an embodiment. Other fields of the advertisement data 401 include length, type, and transmit power. Table 500 in FIG. 5 is provides further details of the advertisement data 401 fields shown in FIG. 4 along with the field size in octets. The command 403 field includes a pairing command and a "deactivate drive mode" command which is used to deactivate drive mode in the passenger mobile communication devices when it is received together with the alphanumeric code 405 and the alphanumeric code 405 matches a previously received alphanumeric code stored in memory.

Figure 6:
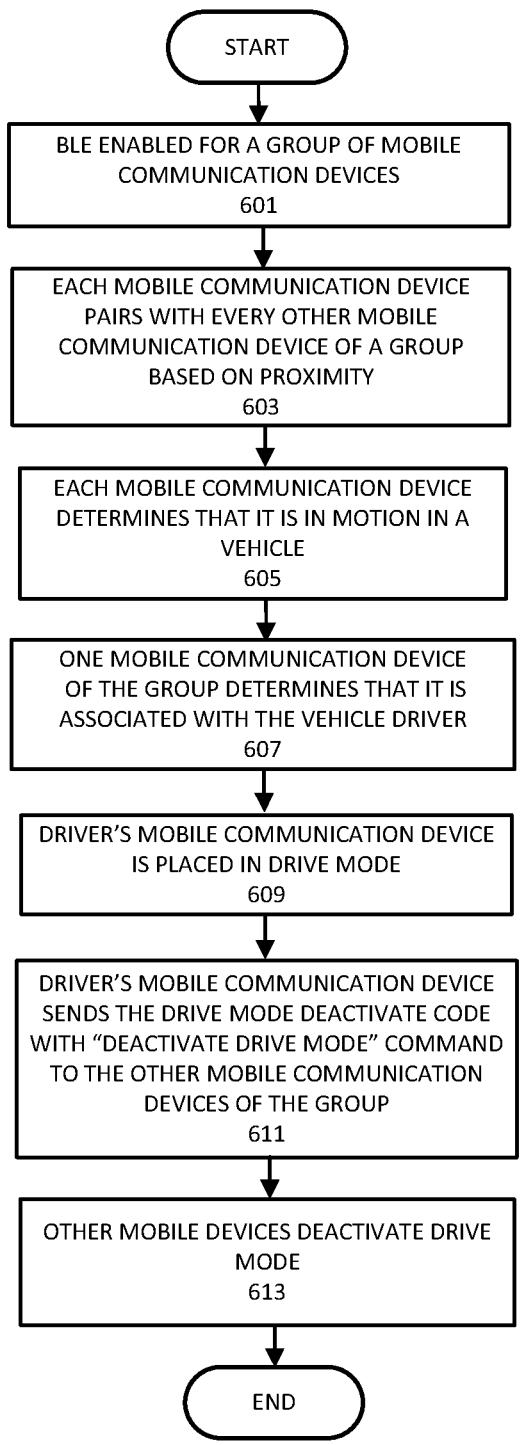
FIG. 6 is a flow chart of a process in a group of mobile communication devices in accordance with various embodiments.

The various operations of the example mobile communication device 300 shown in FIG. 3 and in conjunction with a group of mobile communication devices are best understood in light of the flowcharts of FIG. 6 and FIG. 7 which are described further below. FIG. 6 is a flow chart of a process in a group of mobile communication devices in accordance with various embodiments. The process begins and in operation block 601, BLE is enabled for each mobile communication device of a group. The group may be determined group by a commonly received invitation message sent my one mobile communication device. Those mobile communication devices that accept the invitation message attempt to join the group, and in operation block 603, proceed to pair with other mobile devices in proximity.

During the pairing process in operation block 603 each mobile communication device generates an alphanumeric code for use as a drive mode deactivate code and sends it to each of the other mobile communication devices in the group. This may be accomplished using the advertising packet 400 shown in FIG. 4 where the command 403 field may include the pairing command and the alphanumeric code 405 is used as the drive mode deactivate code. Each mobile communication device of the group stores any received alphanumeric codes in memory for later comparison.

In operation block 605, each mobile communication device of the group may determine that is in motion in vehicle. This may be accomplished in a variety of ways, for example by monitoring sensor data such as from the gyroscope 321 and accelerometer 323 shown in FIG. 3 for example mobile communication device 300 or from various other sensors 325, or by receiving a user voice response to a prompt which asks the user if they are driving the vehicle. In operation block 607, one of the mobile communication devices of the group makes a further determination that is associated with the vehicle driver. This may be accomplished in any number of suitable ways. For example, the mobile communication device may determine that it is placed in a docking station or docking port within the vehicle or that it is in a position relative to where the driver of vehicle would be located or through some other mechanism which is outside the scope of the present disclosure. After making the determination that the mobile communication device is associated with the vehicle driver in operation block 607, that mobile communication device will place itself in drive mode in operation block 609. In operation block 611 the driver's mobile communication device will broadcast an advertising packet with an alphanumeric code (i.e. the drive mode deactivate code) and the deactivate drive mode command to every other mobile communication device of the group. In operation block 613, the other mobile communication devices of the group that have received the advertising packet will deactivate drive mode. The process then ends as shown.

Figure 7:
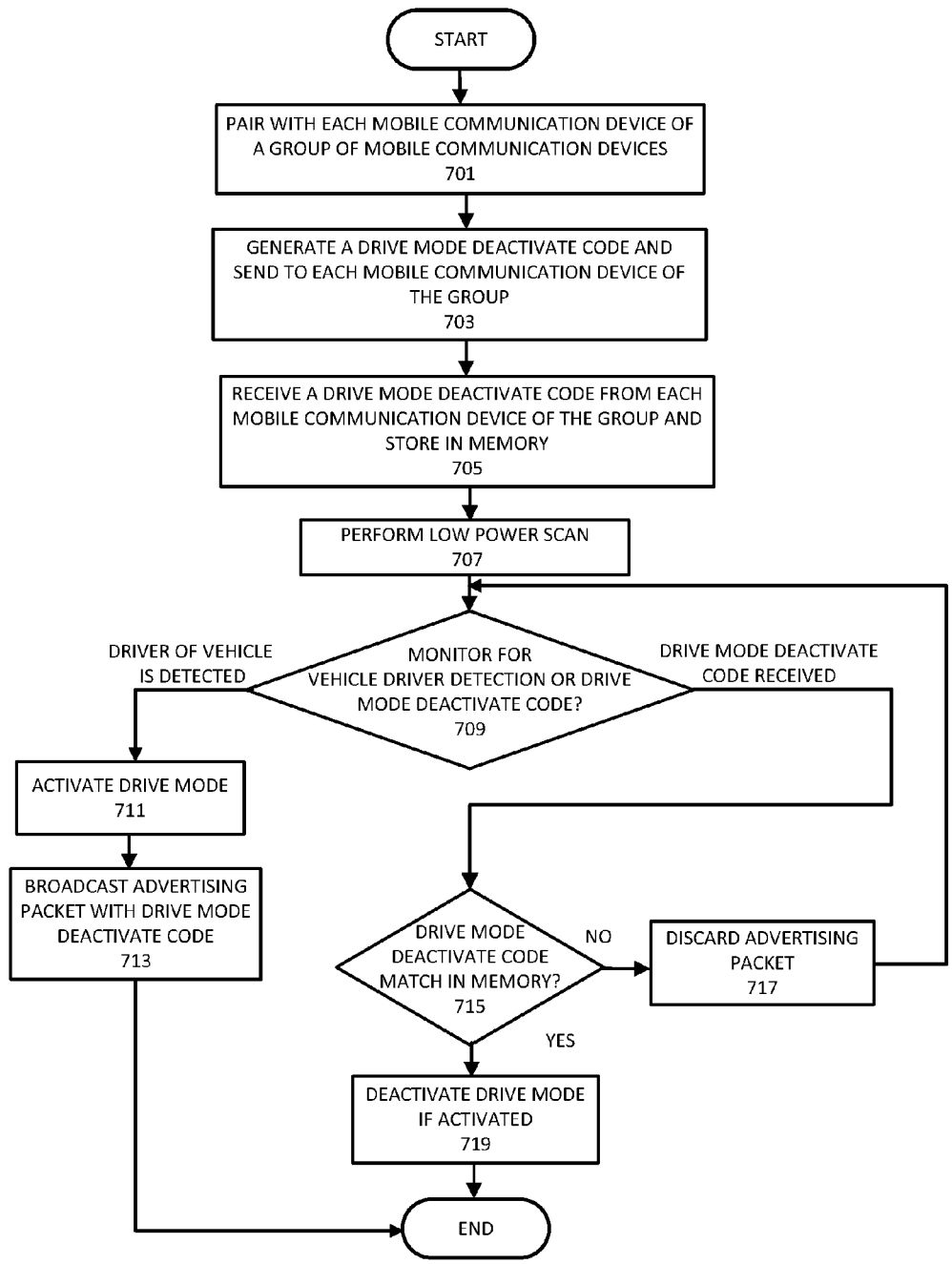
FIG. 7 is a flow chart of a process in an individual mobile communication device in in accordance with an embodiment.

FIG. 7 is a flow chart of a process in an individual mobile communication device in in accordance with an embodiment. The process begins in operation block 701, the mobile communication device pairs with every other communication device of a group. In operation block 703 the mobile communication devices generates a drive mode deactivate code and sends that code to each other mobile communication device of the group. In operation block 705, the mobile communication device receives a drive mode deactivate code from every other mobile communication device of the group and stores the codes in memory.

The mobile communication device then performs a low power scan in operation block 707. In decision block 709, the mobile communication device monitors its own sensors for vehicle driver detection and also monitors whether it has received a drive mode deactivate code over the wireless link from another mobile communication device of the group.

In decision block 709, if the mobile communication device determines that it is associated with the vehicle driver, then the mobile communication device proceeds to activate drive mode in operation block 711 and will broadcast and advertising packet with the drive mode deactivate code as shown in operation block 713. This drive mode deactivate code is the same drive mode deactivate code that was generated by the mobile communication device in operation block 703. The process then ends as shown.

However, if in decision block 709 a drive mode deactivate code is received, the mobile communication device will compare the drive mode deactivate code with one or more code stored in memory as shown in decision block 715. If the received drive mode deactivate code matches a code already stored in memory, then the mobile communication device will deactivate drive mode, if it was previously activated, as shown in operation block 719 and the process then ends as shown. However, if the drive mode deactivate code does not match a code previously stored in memory in decision block 715, then the advertising packet will be discarded as shown in operation block 717 and the mobile communication device will return to decision block 709 and will continue to monitor for vehicle driver detection or for a drive mode deactivate code.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
detecting, by a first mobile communication device, a group of mobile communication devices that are in proximity to the first mobile communication device;
sending a pairing command from the first mobile communication device to the group to initiate pairing of each mobile communication device of the group with the first mobile communication device and with each other member of the group;
sending an alphanumeric code from the first mobile communication device to the group;
determining that the first mobile communication device is located in a vehicle and is associated with the vehicle driver;
placing the first mobile communication device in drive mode in response to determining that the first mobile communication device is associated with the vehicle driver; and
broadcasting an advertising packet, by the first mobile communication device to the group, in response to determining that the first mobile communication device is associated with the vehicle driver , the advertising packet containing a deactivate drive mode command and the alphanumeric code.

2. The method of claim 1, further comprising:
receiving a distinct alphanumeric code from each mobile communication device of the group;
storing each distinct alphanumeric code in memory by the first mobile communication device; and
deactivating drive mode of the first mobile communication device in response to receiving one of the distinct alphanumeric codes a second time from a second mobile communication device of the group.

3. The method of claim 2, further comprising:
receiving the deactivate drive mode command from the second mobile communication device that sent its distinct alphanumeric code a second time; and
deactivating drive mode in response to receiving the second mobile communication device's distinct alphanumeric code a second time and the deactivate drive mode command.

4. The method of claim 2, further comprising:
comparing the distinct alphanumeric code received a second time to each alphanumeric code stored in memory;
confirming that the distinct alphanumeric code received a second time is identical to one of the alphanumeric codes stored in memory; and
deactivating drive mode in response to receiving the distinct alphanumeric code a second time from the second mobile communication device of the group, and confirming that the distinct alphanumeric code received a second time is identical to the alphanumeric code stored in memory.

5. A mobile communication device comprising:
at least one antenna;
a controller, operatively coupled to the antenna, and operative to provide a link layer and a physical layer of a low energy wireless protocol;
non-volatile, non-transitory memory, operatively coupled to the controller;

a processor, operatively coupled to the controller and to the non-volatile, non-transitory memory, and operative to:
provide a host layer of the low energy wireless protocol;
detect a group of other mobile communication devices that are in proximity to the mobile communication device using the low energy wireless protocol;
send a pairing command to the group to initiate pairing of each mobile communication device of the group using the low energy wireless protocol;
send an alphanumeric code to the group using the low energy wireless protocol;
determine that the mobile communication device is located in a vehicle and is associated with the vehicle driver;
place the mobile communication device in drive mode in response to determining that the mobile communication device is located in a vehicle and is associated with the vehicle driver; and
broadcast an advertising packet to the other mobile communication devices of the group using the low energy wireless protocol in response to determining that the mobile communication device is associated with the vehicle driver, the advertising packet containing a deactivate drive mode command and the alphanumeric code.

6. The mobile communication device of claim 5, wherein the processor is further operative to:
receive a distinct alphanumeric code from each mobile communication device of the group;
store each distinct alphanumeric code in memory; and
deactivate drive mode in response to receiving one of the distinct alphanumeric codes a second time from a second mobile communication device of the group.

7. The mobile communication device of claim 6, wherein the processor is further operative to:
receive the deactivate drive mode command from the second mobile communication device that send its distinct alphanumeric code a second time; and
deactivate drive mode in response to receiving the second mobile communication device's distinct alphanumeric code a second time and the deactivate drive mode command.

8. The mobile communication device of claim 6, wherein the processor is further operative to:
compare the distinct alphanumeric code received a second time to each alphanumeric code stored in memory;
confirm that the distinct alphanumeric code received a second time is identical to one of the alphanumeric codes stored in memory; and
deactivate drive mode in response to receiving the distinct alphanumeric code a second time from the second mobile communication device of the group, and confirming that the distinct alphanumeric code received a second time is identical to the alphanumeric code stored in memory.

9. A method of operating a group of mobile communication devices comprising:
detecting, by a first mobile communication device, a group of mobile communication devices that are in proximity to the first mobile communication device;
sending a pairing command from the first mobile communication device to the group to initiate pairing of each mobile communication device of the group with the first mobile communication device and with every other member of the group such that each mobile communication device of the group is paired with every other mobile communication device of the group;
sending a distinct alphanumeric code from each mobile communication device of the group to each of the other members of the group;
determining that the first mobile communication device is located in a vehicle and is associated with the vehicle driver;
placing the first mobile communication device in drive mode in response to determining that the first mobile communication device is associated with the vehicle driver; and
broadcasting an advertising packet by the first mobile communication device to the group, in response to determining that the first mobile communication device is associated with the vehicle driver, the advertising packet containing a deactivate drive mode command and the alphanumeric code.

10. The method of claim 9, further comprising:
storing the distinct alphanumeric code sent from each mobile communication device of the group by every other member of the group in non-volatile, non-transitory memory;
receiving the first mobile communication device's distinct alphanumeric code a second time in the advertising packet from the first mobile communication device by every other mobile communication device of the group; and
deactivating drive mode by each mobile communication device of the group, except for the first mobile communication device, in response to receiving the distinct alphanumeric code from the first mobile communication device a second time.

11. The method of claim 10, further comprising:
receiving the deactivate drive mode command from the first mobile communication device in the advertising packet from the first mobile communication device by every other mobile communication device of the group; and
deactivating drive mode by each mobile communication device of the group, except for the first mobile communication device, in response to receiving the distinct alphanumeric code from the first mobile communication device a second time and the deactivate drive mode command.

12. The method of claim 10, further comprising:
comparing the first mobile communication device's distinct alphanumeric code, received a second time in the advertising packet, to the alphanumeric codes stored in memory, by each mobile communication device of the group of mobile communication devices; and
deactivating drive mode by each mobile communication device of the group of mobile communication devices, except for the first mobile communication device, in response to receiving the first mobile communication device distinct alphanumeric code a second time and confirming that the distinct alphanumeric code received a second time is identical to one of the alphanumeric codes stored in memory.

* * * * *